(12) United States Patent
Kato et al.

(10) Patent No.: US 7,413,268 B2
(45) Date of Patent: Aug. 19, 2008

(54) RUBBER CRAWLER TRACK AND METHOD OF PRODUCING METAL CORE FOR RUBBER TRACK

(75) Inventors: Yusaku Kato, Fukuyama (JP); Tsuyoshi Uchiyama, Fukuyama (JP); Tatsuya Norito, Fukuyama (JP)

(73) Assignee: Fukuyama Gomu Kogyo Kabushiki Gaisha, Fukuyama (JP)

( * ) Notice: Subject to any disclaimer, the term of this patent is extended or adjusted under 35 U.S.C. 154(b) by 198 days.

(21) Appl. No.: 10/563,114

(22) PCT Filed: Jun. 18, 2004

(86) PCT No.: PCT/JP2004/008598

§ 371 (c)(1), (2), (4) Date: Jan. 3, 2006

(87) PCT Pub. No.: WO2005/002952

PCT Pub. Date: Jan. 13, 2005

(65) Prior Publication Data

US 2006/0279138 A1    Dec. 14, 2006

(30) Foreign Application Priority Data

Jul. 2, 2003    (JP) .............................. 2003-270391

(51) Int. Cl.
*B62D 55/24*    (2006.01)
(52) U.S. Cl. .................. 305/172; 305/167; 305/177
(58) Field of Classification Search ................ 305/165, 305/167, 171, 172, 173, 174, 175, 176, 177, 305/170
See application file for complete search history.

(56) References Cited

U.S. PATENT DOCUMENTS 5,522,654 A * 6/1996 Katoh .................. 305/174
5,522,655 A * 6/1996 Katoh .................. 305/174

FOREIGN PATENT DOCUMENTS

| JP | 01266080 A | * | 10/1989 |
|----|------------|---|---------|
| JP | 04342680 A | * | 11/1992 |
| JP | 5-58357    |   | 3/1993  |
| JP | 05065083 A | * | 3/1993  |
| JP | 5-162666   |   | 6/1993  |
| JP | 6-87473    |   | 3/1994  |
| JP | 06087473 A | * | 3/1994  |
| JP | 8-301155   |   | 11/1996 |
| JP | 2601638    |   | 10/1999 |

* cited by examiner

*Primary Examiner*—Russell D. Stormer
*Assistant Examiner*—Kip T Kotter
(74) *Attorney, Agent, or Firm*—Merek, Blackmon & Voorhees, LLC

(57) ABSTRACT

A rubber crawler track in which a local side displacement is more effectively prevented to effectively prevent wheel runoff, which can reduce traveling vibration, and in which separation of metal cores is prevented for improved durability of the rubber crawler track and for reduced costs. The expression of $\Delta r \leq r \leq 2\Delta r$ is satisfied, with "r" being the distance, in the circumferential direction of the rubber crawler track, between ends of horizontal protrusions (6) facing each other between adjacent metal cores (3) embedded in a rubber crawler body in a horizontal state of the rubber crawler track, "h" being the distance from a steel cord (5) layer embedded in the rubber crawler body to the core metal horizontal protrusions (6), and $\Delta r$ being a value obtained by $\Delta r = 2\pi h/n$ where "n" is the number of sprocket teeth of a traveling device.

2 Claims, 15 Drawing Sheets

Fig. 4
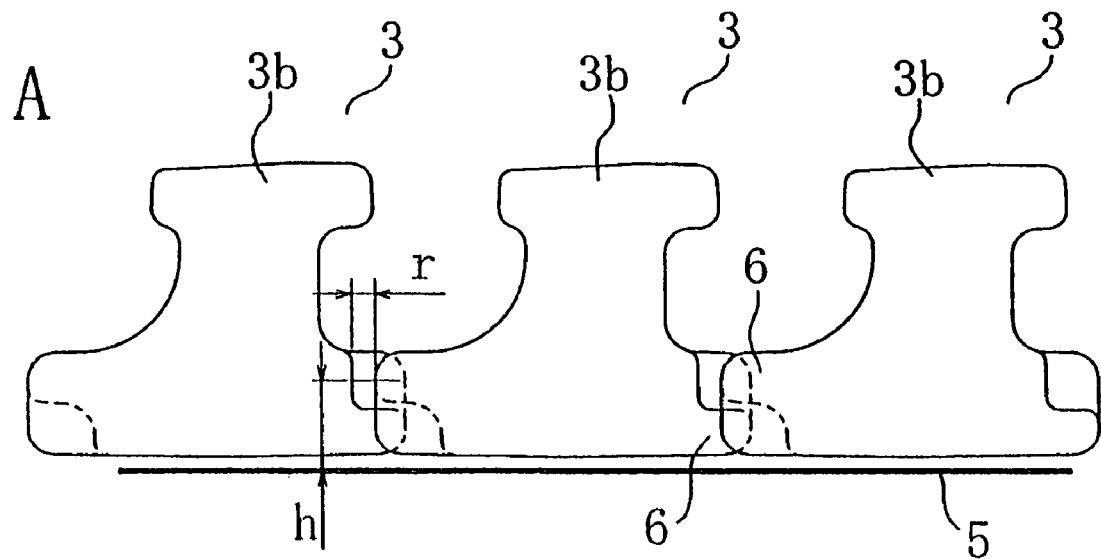
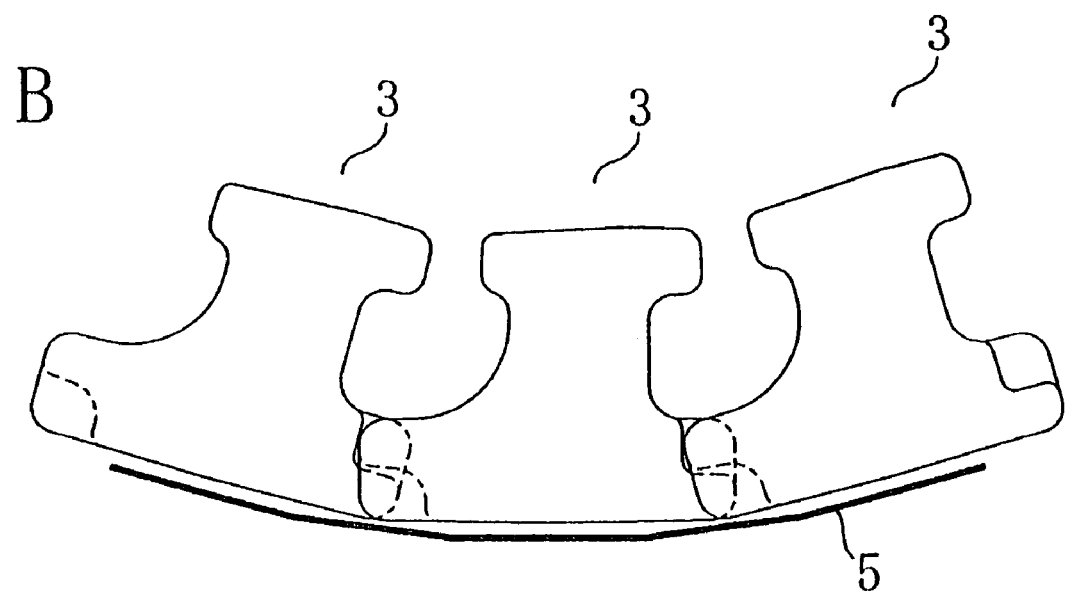

Fig. 5
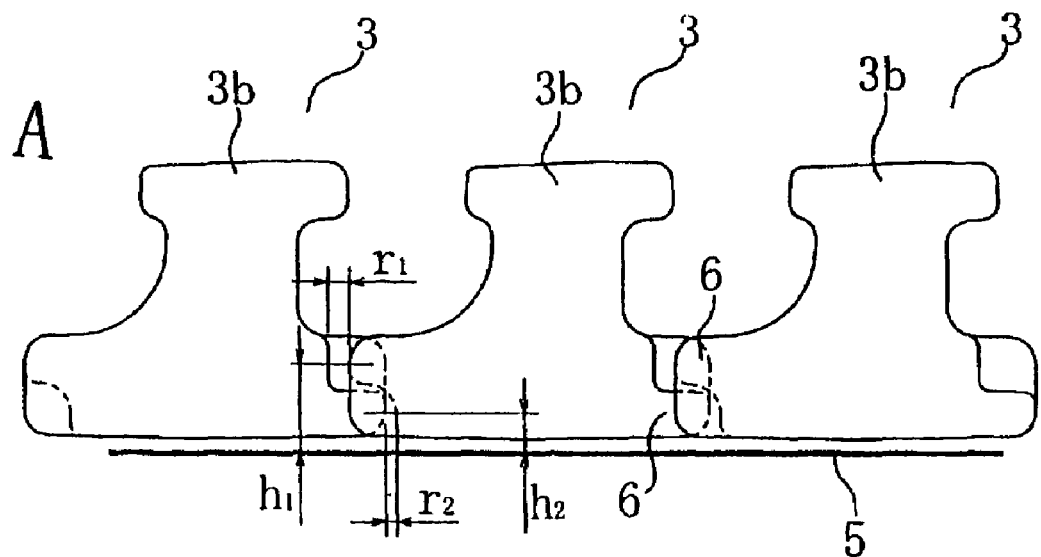
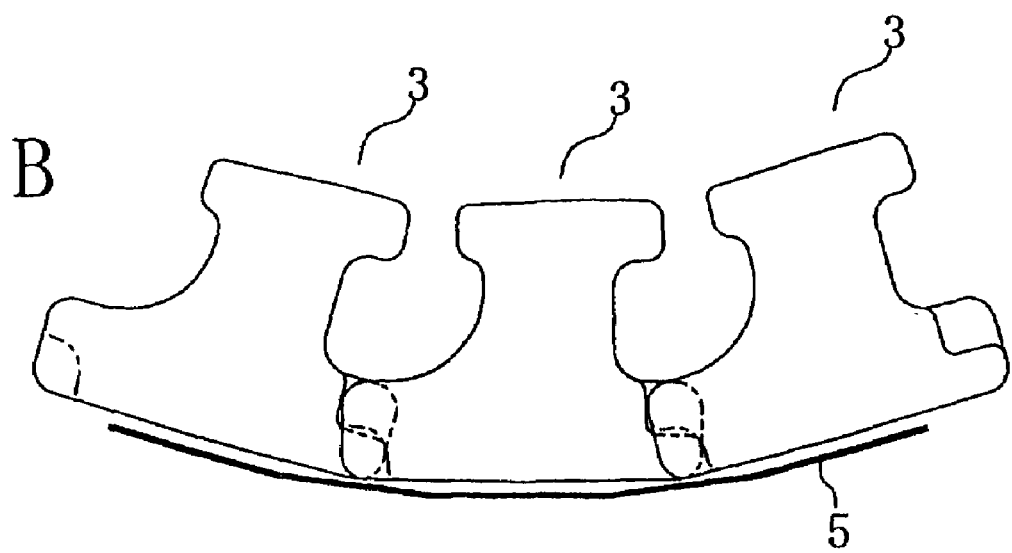

Fig. 8
Conventional parting plane   Parting plane in the present invention
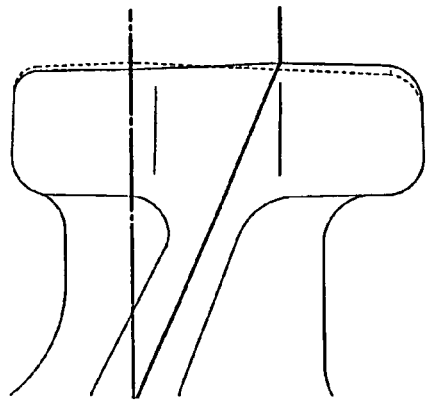
The sinkage of rolling wheel
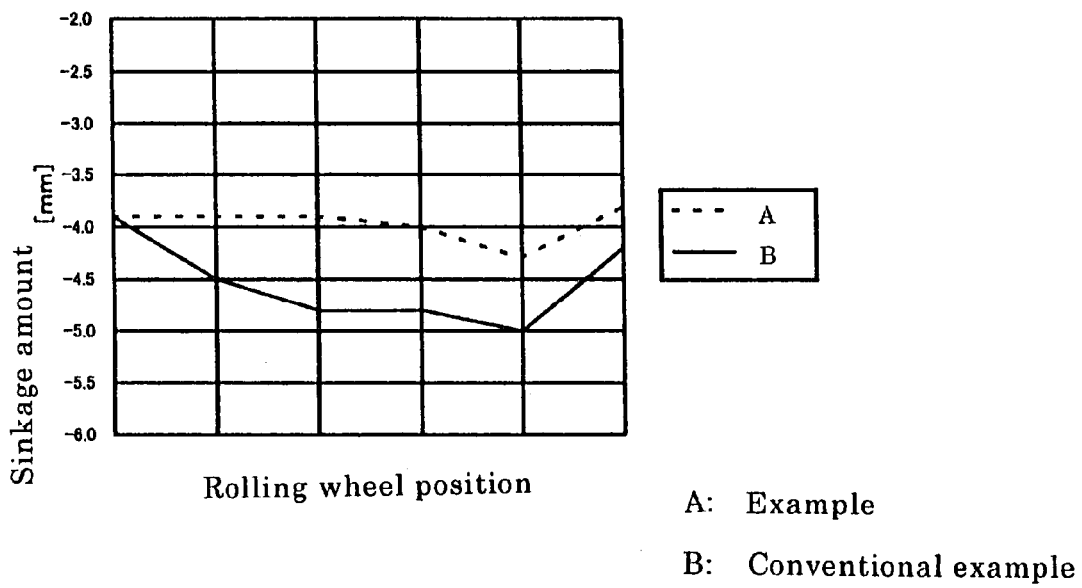
A: Example
B: Conventional example Fig. 10
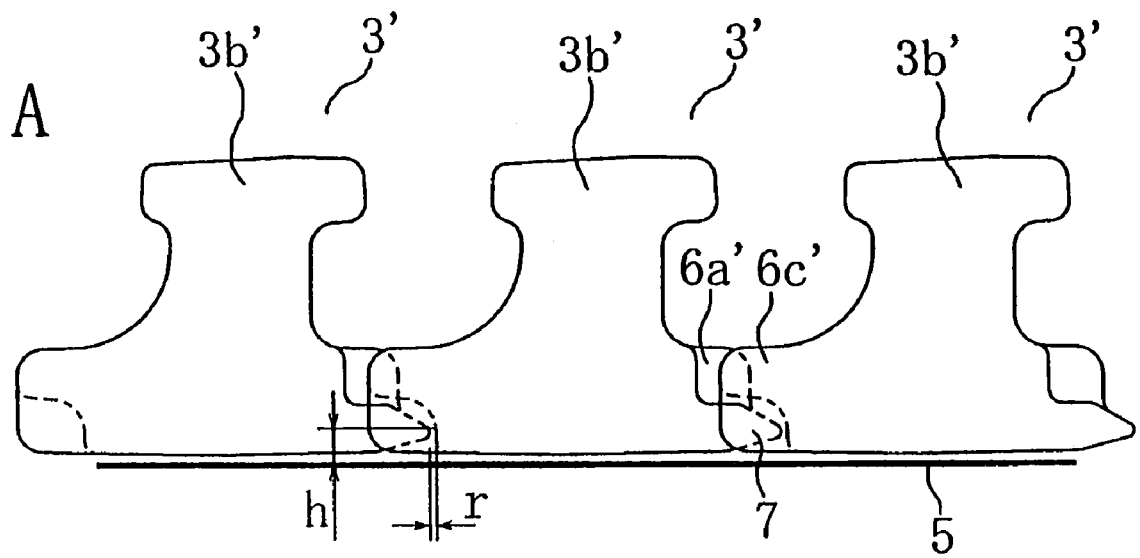
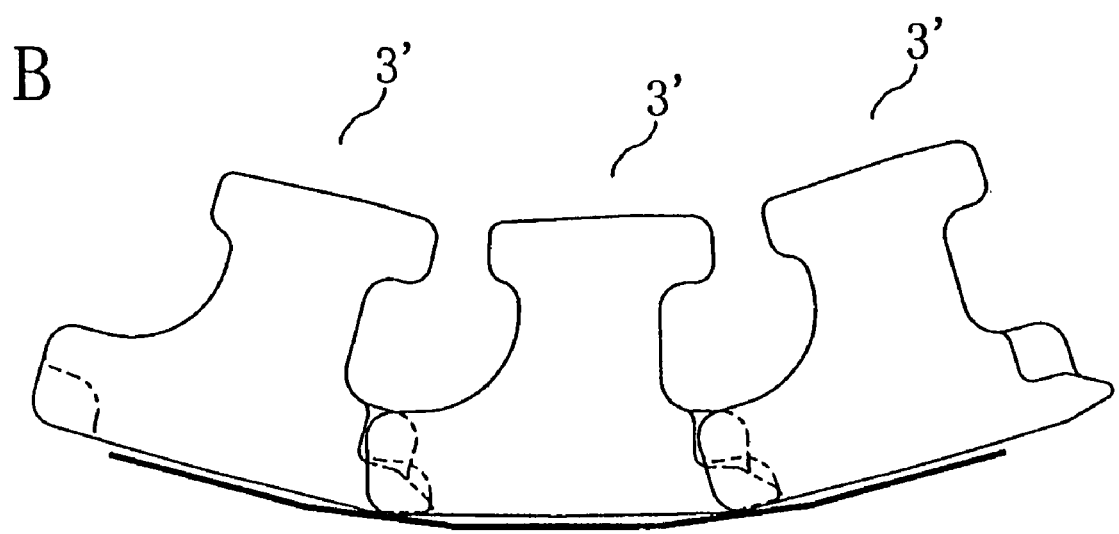

Prior Art

Fig. 12
A
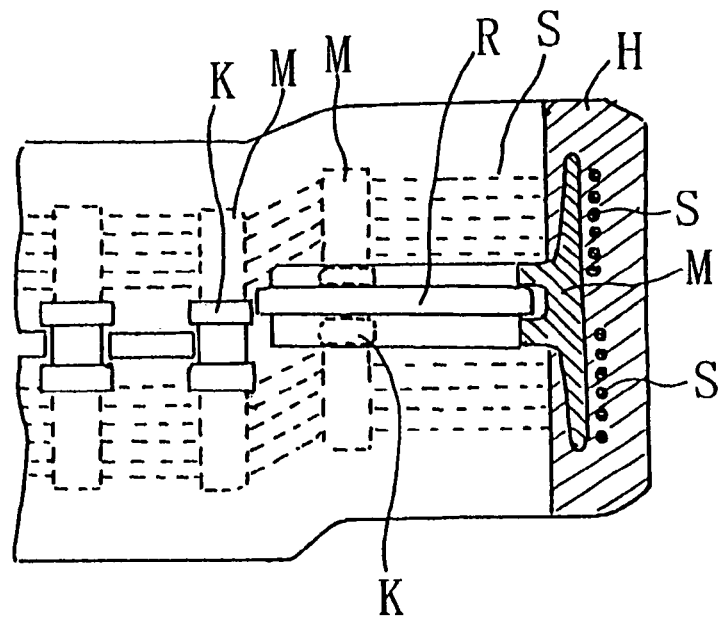
B
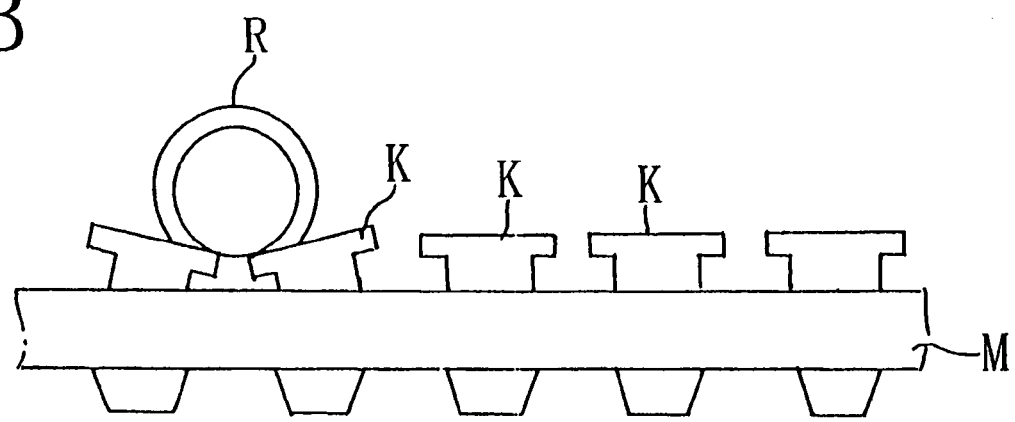
Prior Art

Fig. 13
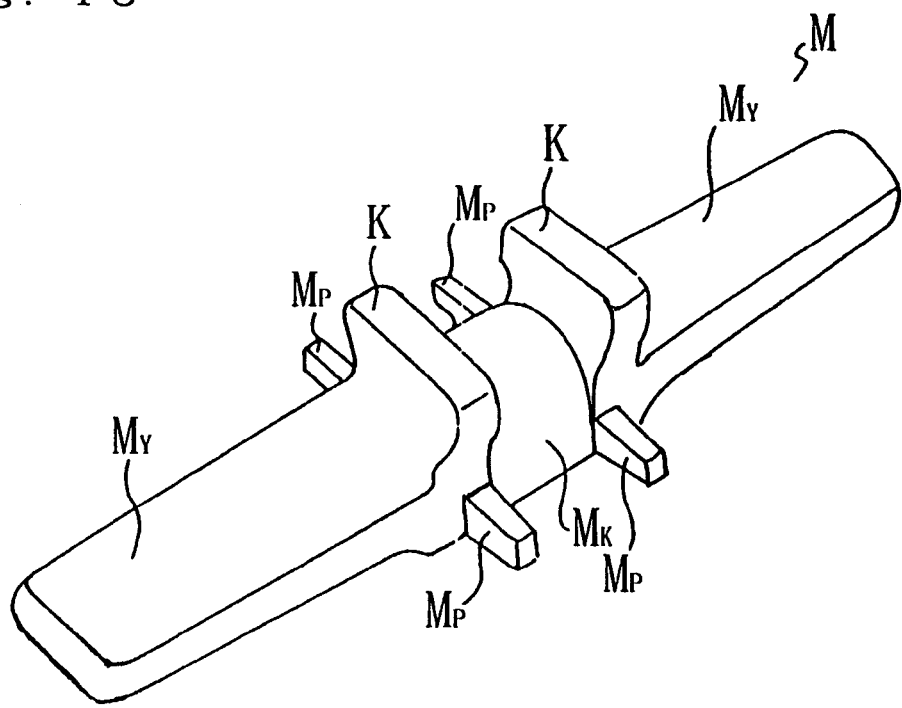
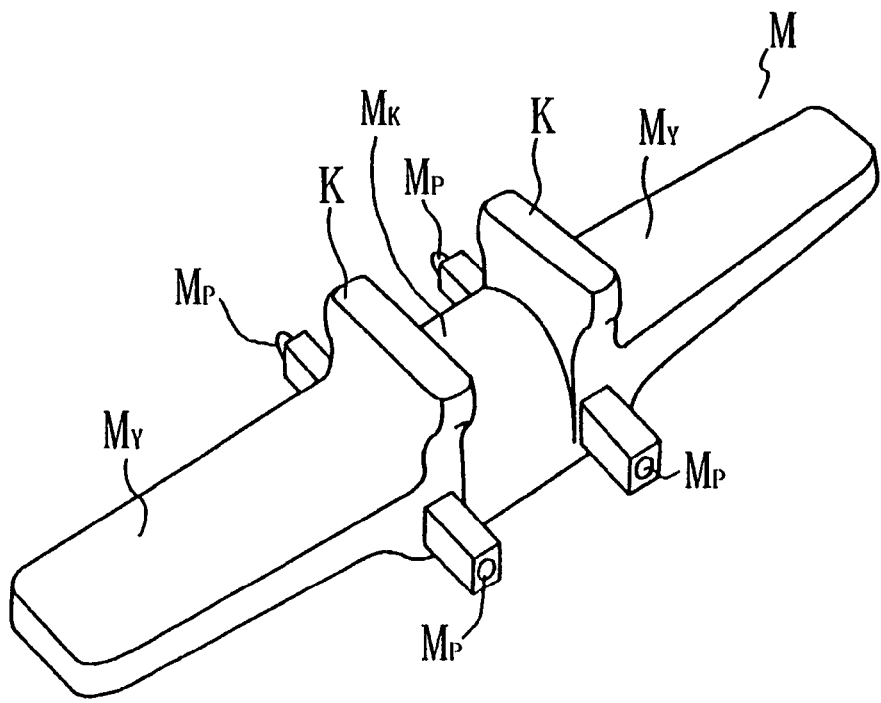
Prior Art

Fig. 14
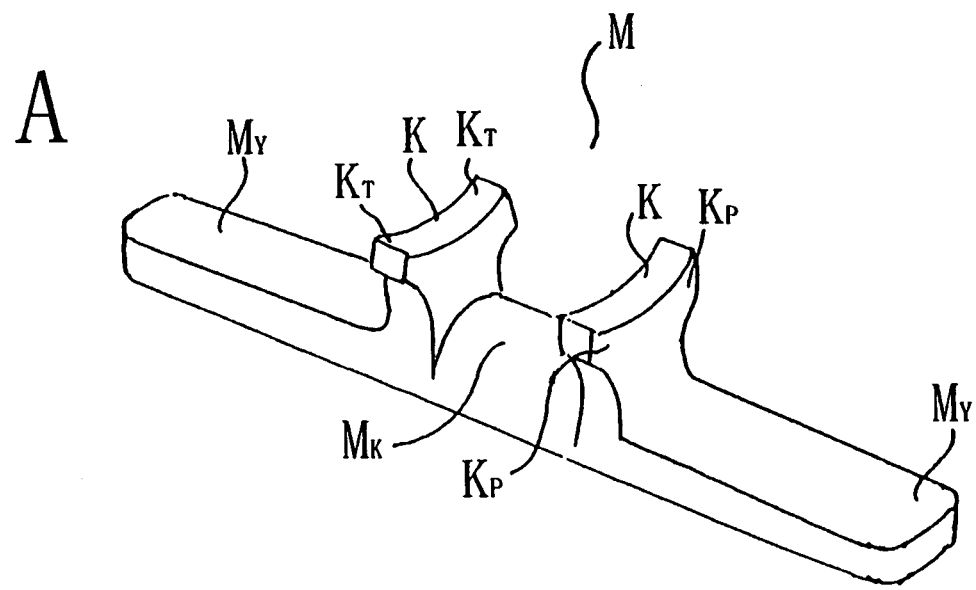
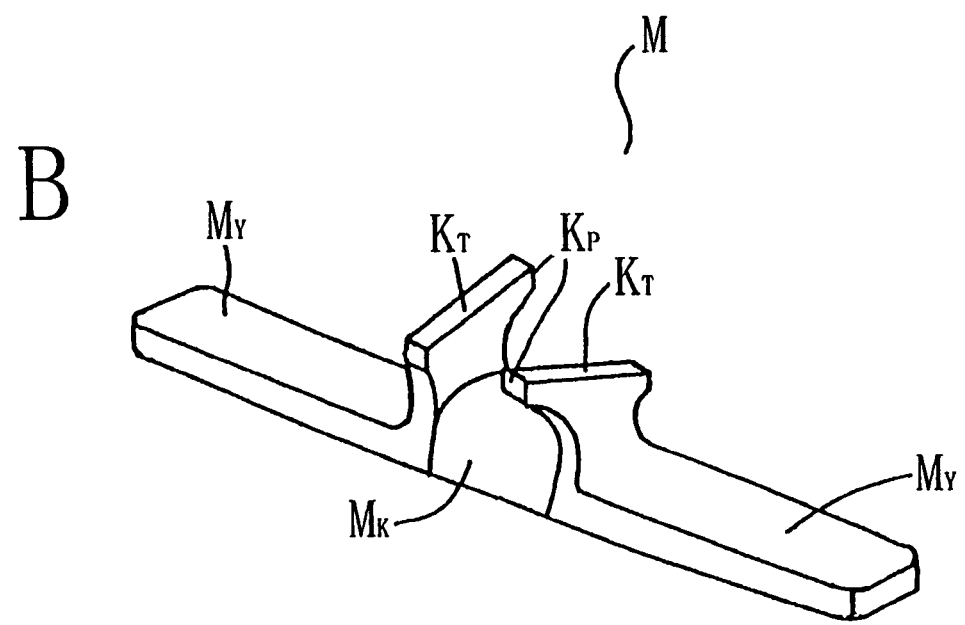
Prior Art

Fig. 15
A
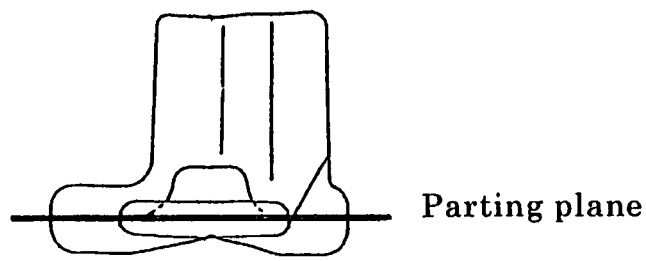
Parting plane
B
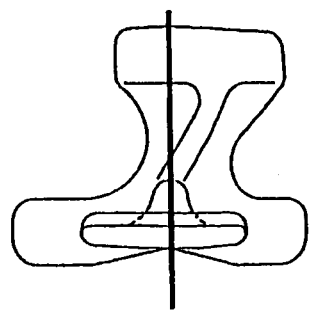
Parting plane
Prior Art

RUBBER CRAWLER TRACK AND METHOD OF PRODUCING METAL CORE FOR RUBBER TRACK

CROSS-REFERENCE TO RELATED APPLICATION

The present application claims the priority under 35 U.S.C. 119 of Japanese Patent Application No. 2003-270391, filed Jul. 2, 2003, which is hereby incorporated herein by reference in its entirety.

TECHNICAL FIELD

The present invention relates to a rubber crawler track mounted on an endless track traveling device, which is used in mobile construction machines, civil working vehicles, farm working machines, and industrial vehicles such as transportation vehicles, and a method of producing a metal core for the rubber crawler track.

TECHNICAL BACKGROUND

FIG. 11 shows a conventional rubber crawler track C. Steel cords S are embedded in a rubber crawler body shaped as an endless belt from a rubber elastic body as circumferential reinforcing members, and metallic cores M are embedded therein as width directional reinforcing members. K is a guide protrusion for guiding a rolling wheel.

In the conventional rubber crawler track, as shown in FIG. 12A, side displacement occurs between adjacent metal cores. Because of the side displacement, a rolling wheel R of a crawler traveling device goes across the guide protrusion K to run off, and the rubber crawler track comes off the traveling device.

In addition, the conventional rubber crawler track is so constructed, as shown in FIG. 12B, that the rolling wheel R rolls on the guide protrusions K. Therefore, the rolling wheel R rolls on the guide protrusions K, sinking between the metal cores adjoining longitudinally in a circumferential direction and thereby increasing traveling vibration. To solve this problem, a rubber crawler track for reducing the sinking of the rolling wheel has been proposed. Therein, the rolling face of the guide protrusion is extended circumferentially, the guide protrusion is T-shaped, and the distance between the metal cores is shortened. However, as to even this structure, the metal cores incline and the rolling wheels sink after all.

An invention disclosed in Japanese utility model registration No. 2551937 has been proposed to prevent wheel run-off caused by the side displacement of the rolling wheel. The invention is to prevent the side displacement of the rubber crawler track and the wheel run-off by arranging horizontal protrusions MP on a metal core M. In FIG. 13A, MY is a metal core wing portion.

In addition, an invention disclosed in Japanese patent No. 2554552 and Japanese utility model publication No. 000226 of 1996 has been proposed to prevent traveling vibration due to the sinking of the rolling wheel and the inclination of the metal cores. In this invention, the top of the guide protrusion K forms an inclination KT to form a continuous rolling wheel track and reduce the vibration. That is, when the rolling wheel R gets on guide protrusion overhangs KP, the overhangs KP gravitate somewhat to keep the height of track of the rolling wheel and approach the guide protrusion K of the adjacent metal core M to reduce the distance between the metal cores. In FIG. 14, MK is an engaging portion of the metal core.

Moreover, an invention disclosed in Japanese utility model registration No. 2601638 has been proposed to settle the following problems. Problem 1:

When the rolling wheel travels on the guide protrusions of the rubber crawler track, an external force such as a rolling wheel load is added on crawler circumferential ends of the guide protrusion top. According to this, the guide protrusion inclines, the rolling wheel sinks, and the traveling vibration occurs.

Problem 2:

The metal core comes off the rubber crawler track in a stroke due to an external force like a pushing-up from the side of the guide protrusion, caused by the interaction between the crawler track and the traveling device. Here, the interaction is caused by stones pushing between the guide protrusions or by the discrepancy of the traveling device. In this case, sometimes, adhesion between the rubber and the metal core is overcome, and core is peeled away.

In the invention of Japanese utility model registration No. 2601638, the horizontal protrusions MP are formed within the thickness of the wing portion of the metal core embedded in the rubber crawler track or below it so as to cross perpendicularly to the side of the metal core. When the metal core is embedded in the rubber crawler body, horizontal protrusions MP between the adjacent metal cores are embedded so as to overlap in a crawler width direction (lateral direction) and in a crawler thickness direction (vertical direction). Therefore, a local side displacement of the rubber crawler track and vibration of the metal core are prevented, thereby preventing the crawler run-off, the rolling wheel sinking, and the metal core peel-off (See FIG. 13B). Reference is made to Japanese utility model registration No. 2551937,
Japanese utility model registration No. 2601638,
Japanese patent No. 2554552, and
Japanese utility model publication No. 000226 of 1996.

SUMMARY OF THE INVENTION

Problem to be Solved by the Invention

The rubber crawler track in Japanese utility model registration No. 2601638 can solve the following conventional problems.

(1) The problem in which the side displacement occurs between the adjacent metal cores, the rolling wheel of the crawler driving device goes across the guide protrusion of the metal core to run off, and the rubber crawler track comes off the driving device.

(2) The problem in which the traveling vibration is increased by the sinking between the adjacent metal cores of the rolling wheel and by the inclination of the metal cores.

(3) The problem in which the metal core comes off the rubber crawler track due to the vibration.

However, this horizontal protrusion has only a small section modulus, and therefore, there is an uneasiness in the strength of protrusion.

In addition, the conventional rubber crawler track has the following problems.

Generally, a rubber crawler track transmits a driving force from the driving device to the rubber crawler track by engaging sprocket teeth of the driving device with the engaging portion of the metal core.

When transmitting the driving force to the metal core, there occurs adhesive fatigue on a shearing face between the metal core and a steel cord layer, and the metal core comes off. This problem needs preventing effectively.

In addition, it is impossible to apply the structure for improving the traveling vibration, which is disclosed in Japanese patent No. 2554552 or Japanese utility model publication No. 000226 of 1996, to the metal core having horizontal protrusions disclosed in Japanese utility model registration No. 2601638, because the mold shape for producing metal cores is restricted.

In molding the metal cores of FIG. 14, which have the structure disclosed in Japanese patent No. 2554552 or Japanese utility model publication No. 000226 of 1996, the parting plane of the mold must be formed at the line position in FIG. 15A so as to part vertically. However, in molding the metal cores for improving the wheel run-off, which is disclosed in Japanese utility model registration No. 2601638, the parting plane must be formed at the line position in FIG. 15B so as to part laterally on forming the horizontal protrusions. Therefore, the height of the guide protrusion top at the center of the metal core becomes maximized because a trimming taper is formed. Consequently, the traveling vibration is increased.

The present invention aims to solve the above-mentioned problems and provide a rubber crawler track in which a local side displacement is more effectively prevented to effectively prevent wheel run-off, which can improve traveling vibration, and in which separation of metal cores is prevented for improved durability of the rubber crawler track and for reduced costs.

Means to Solve the Problem

The present invention is achieved for the above-mentioned aims.

Generally, a rubber crawler track comprises an endless belt-shaped rubber crawler body made of a rubber elastic body and the like, many steel cords stratifiedly embedded therein, and metal cores embedded at a fixed interval in the crawler circumferential direction.

A metal core used in the present invention is provided with horizontal protrusions. The horizontal protrusions are provided on sides of the metal core in the width direction on at least one of two sides of an engaging portion of the metal core, within the thickness of metal core wing portions in the vertical direction and an area on the tread side below the thickness. When these are embedded in the rubber crawler body, ends of horizontal protrusions facing each other between adjacent metal cores in the circumferential direction overlap in a crawler width direction and in a crawler thickness direction within a fixed length.

The first feature of the invention is to express a distance "r" between the ends of the horizontal protrusions in the crawler circumferential direction as $\Delta r \leq r \leq 2\Delta r$. In this case, the rubber crawler track is horizontal.

Here, $\Delta r$ is obtained by $\Delta r = 2\pi h/n$ where "h" is a distance from a steel cord layer to the horizontal protrusion, and "n" is the number of the sprocket teeth of the traveling device.

Accordingly, the distance "r" is expressed as $2\pi h/n \leq r \leq 4\pi h/n$.

The second feature of the present invention is to form a tapered horn portion on an end of one of the horizontal protrusions facing the adjacent metal cores.

The third feature of the present invention is to shift a parting plane of a mold for producing metal cores left and right from the center at guide protrusion sides due to shifting left and right guide protrusions of the crawler width direction of the metal cores longitudinally in the crawler circumferential direction so as to shift the highest positions of the guide protrusions longitudinally in the crawler circumferential direction from the center of the metal cores.

EFFECT OF INVENTION

According to the above-mentioned first feature, shearing force transmitted from a sprocket is dispersed, thereby preventing the metal core from separating from the rubber crawler track. In addition, it is possible to reduce the shearing area between the metal core and the steel cords and reduce the cost.

In addition, according to the above-mentioned third feature, the height of the guide protrusion top on the center line in the crawler longitudinal direction of the metal core can be lowered so as to shape a rolling contact surface of the rolling wheel with the left and right guide protrusions in the metal core longitudinal direction. Therefore, traveling vibration can be effectively prevented. Hence, it is possible to prevent traveling vibration in even metal cores with the horizontal protrusions.

BRIEF EXAMINATION OF THE DRAWINGS

FIG. 1A is a front view; FIG. 1B is a side view; and FIG. 1C is a plan view of a side opposite the tread side of a metal core to be embedded in a rubber crawler track. (The first embodiment)

Figure 3:
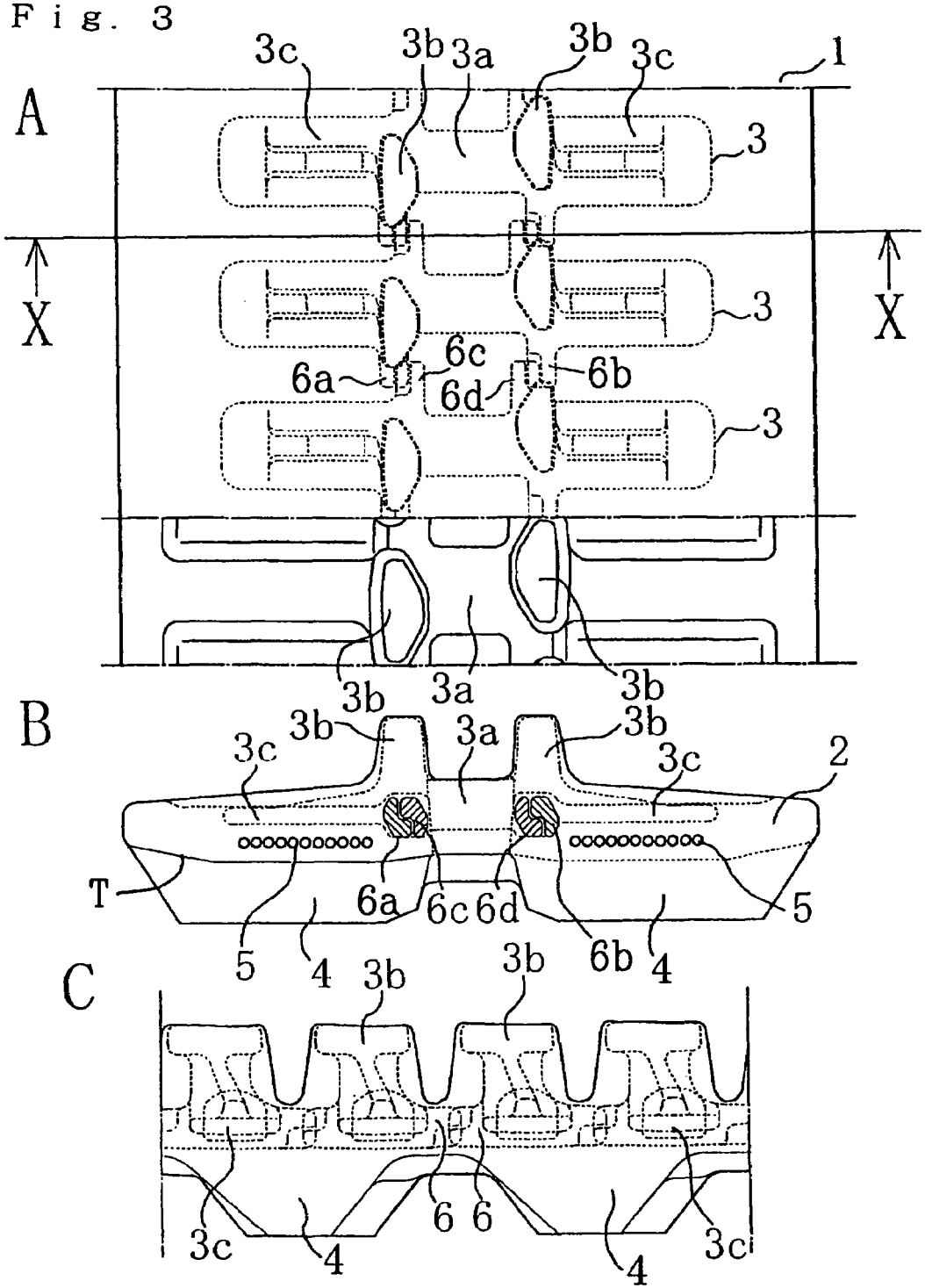

FIG. 3 shows the rubber crawler track. FIG. 3A is a plan view of a side opposite the tread side; FIG. 3B is a sectional view taken along line X-X of FIG. 3A; and FIG. 3C is a side view of FIG. 3A. (The first embodiment)

FIG. 4 is a view for explaining the horizontal protrusions between the adjacent metal cores embedded in the rubber crawler body. FIG. 4A is an explanatory view of the sides of adjacent metal cores while the crawler track contacts on the ground (in a horizontal state). FIG. 4B is an explanatory view thereof while the crawler track is wound around an idler-sprocket of the traveling device. (The first embodiment)

FIG. 5 is a view for explaining the horizontal protrusions between the adjacent metal cores embedded in the rubber crawler body. FIG. 5A is an explanatory view of the side showing the relation of the adjacent metal cores while the crawler track contacts on the ground (in a horizontal state). FIG. 5B is an explanatory view of the sides showing the relation of the adjacent metal cores while the crawler track is wound around the idler-sprocket of the traveling device. (Another embodiment of the first embodiment)

Figure 6:
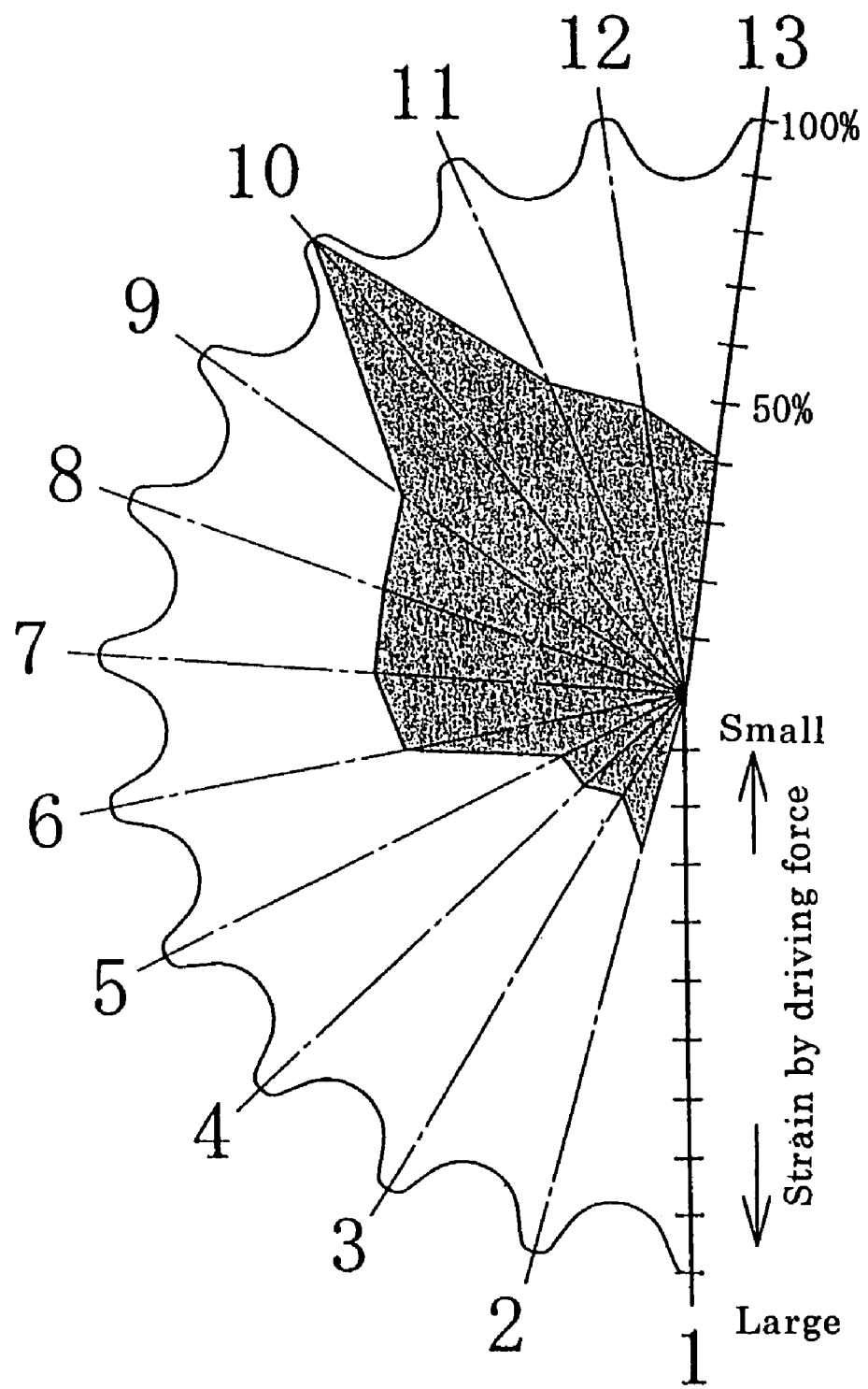

FIG. 6 is a graph showing a ratio of load for the sprocket teeth in transmitting traction capacity from the sprocket to the rubber crawler track.

Figure 7:
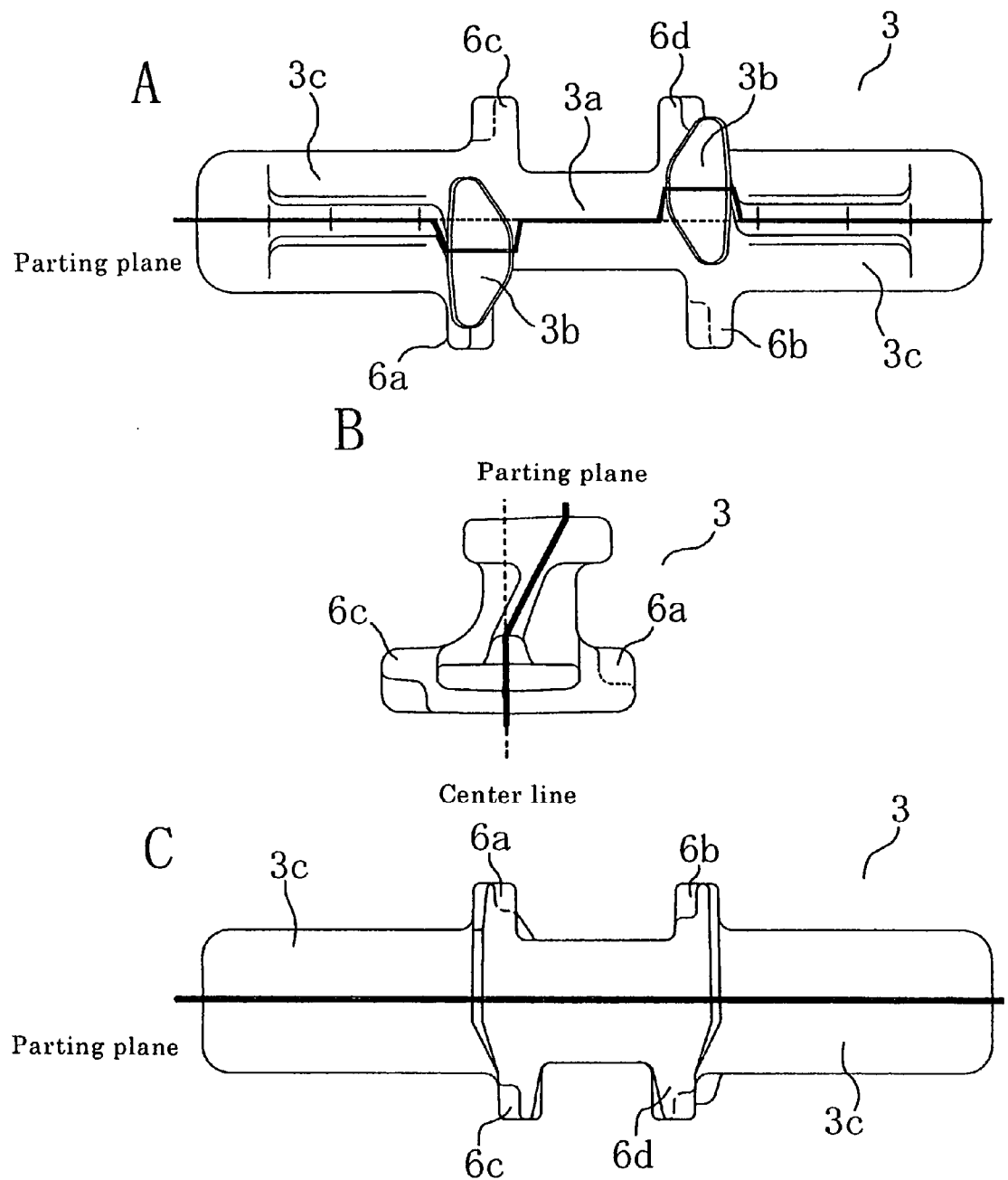

FIG. 7 is an explanatory view of a metal core showing a parting plane of a mold for producing the metal core. FIG. 7A is a plan view of the anti-tread side of the metal core embedded in the rubber crawler track; FIG. 7B is a side view; and FIG. 7C is a plan view of the tread side. (The first embodiment)

FIG. 8 is a graph showing the rolling-wheel sinkage of a metal core whose guide protrusion top forms a trimming taper from the center, produced by a conventional laterally parting mold, and a metal core whose guide protrusion is shifted in the crawler circumferential direction and whose parting plane is shifted at the guide protrusion side in the present invention. (The first embodiment)

Figure 9:
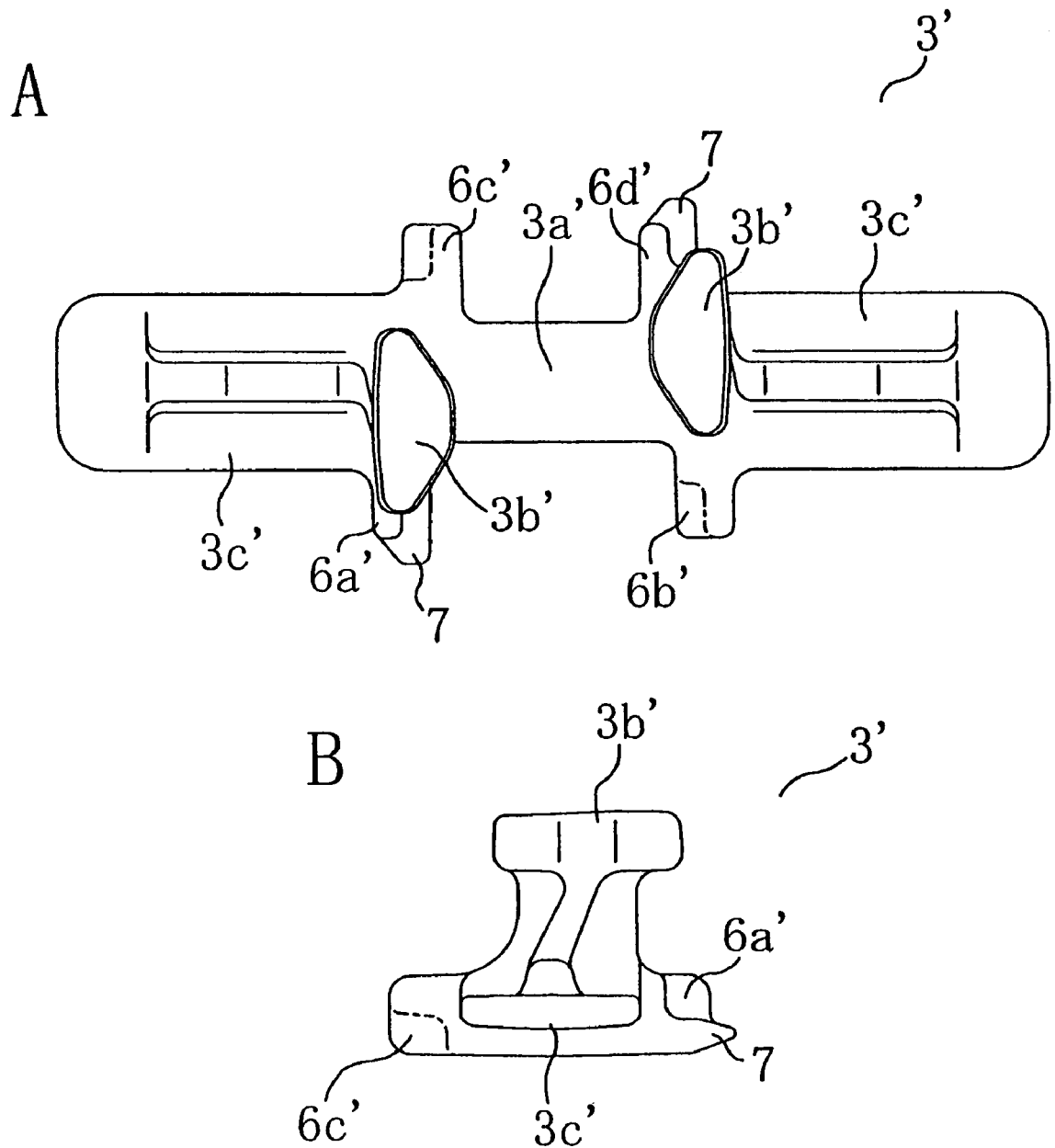

FIG. 9 shows a metal core to be embedded in the rubber crawler body. FIG. 9A is a plan view of a side opposite the tread, and FIG. 9B is a side view. (The second embodiment)

FIG. 10 is a view for explaining the horizontal protrusions between the adjacent metal cores embedded in the rubber crawler body. FIG. 10A is an explanatory view of the side, showing the relation of the adjacent metal cores while the crawler track contacts the ground (in a horizontal state). FIG. 10B is an explanatory view of the side showing the relation of the adjacent metal cores while the crawler track is wound around the idler-sprocket of the traveling device. (The second embodiment)

Figure 11:
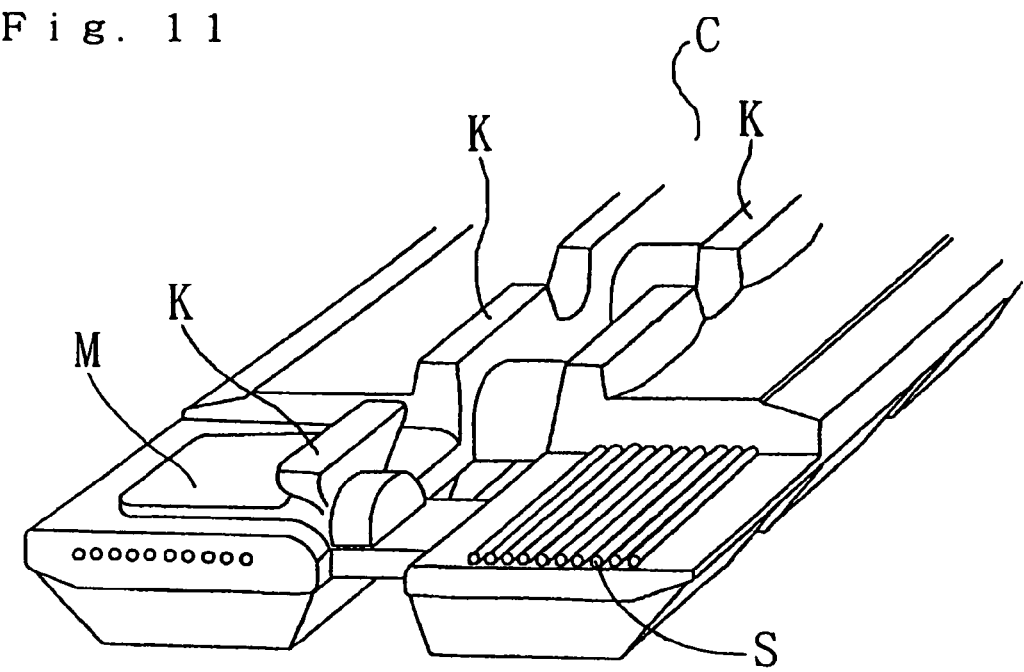

FIG. 11 is a partly sectional fragmentary perspective view of a rubber crawler track. (Conventional embodiment)

FIG. 12 is a view for explaining problems of the rubber crawler track.

FIG. 12A is a plan view for explaining the problem that the rubber crawler track comes off the traveling device. FIG. 12B is a side view for explaining the problem that traveling vibration of the rubber crawler track gets louder. (Conventional embodiment)

FIG. 13A and FIG. 13B are perspective views of conventional metal cores for overcoming the problems of the rubber crawler track. (Conventional embodiment)

FIG. 14A and FIG. 14B are perspective views of conventional metal cores for overcoming the problems of the rubber crawler track. (Conventional embodiment)

FIG. 15 is a side view of the metal core for explaining a parting plane of a conventional mold. (Conventional embodiment)

PREFERRED EMBODIMENTS OF THE INVENTION

A rubber crawler track comprises an endless belt-shaped rubber crawler body made of a rubber elastic body, many steel cords and metal cores. The steel cords are embedded in the rubber crawler body so as to form a layer. The metal cores are embedded at a fixed interval in a circumferential direction of the rubber crawler track, each comprising an engaging portion, guide protrusions for preventing wheel run-off, wing portions and horizontal protrusions. The engaging portion is formed at the center of the length of core, and the guide protrusions and the wing portions are respectively formed on both sides of the engaging portion. The horizontal protrusions are provided on sides of the metal core in the width direction on at least one of the sides of the engaging portion within the thickness of metal core wing portions in the vertical direction and an area on the tread side below the thickness. When the horizontal protrusions are embedded in the rubber crawler body, they face each other between the adjacent metal cores in the crawler circumferential direction, and the ends of the horizontal protrusions overlap in the crawler width direction and in the crawler thickness direction within the fixed length. In this case, a distance "r", in the circumferential direction of the rubber crawler track, between the ends of the horizontal protrusions facing each other between the adjacent metal cores is expressed as $\Delta r \leq r \leq 2\Delta r$. In this case, the rubber crawler track is horizontal.

$\Delta r$ is calculated by $\Delta r = 2\pi h/n$ ("h" is a distance from a steel cord layer embedded in the rubber crawler body to the horizontal metal core, and "n" is the number of sprocket teeth of the driving device).

Accordingly, when the rubber crawler track is engaged with the sprocket, there comes to be no space between the ends of the horizontal protrusions of the adjacent metal cores. Therefore, the shearing force applied when the driving force is transmitted from the sprocket teeth to the metal core engaging portion does not concentrate on a metal core but disperses to the adjacent metal cores through the horizontal protrusions. The shearing force is dispersed to a next metal core through the horizontal protrusions one after another. Therefore, the metal cores are prevented from separating from the rubber crawler track.

In addition, it is possible to reduce the shearing area between the metal cores and the steel cords, and reduce the cost.

Moreover, in the present invention, an end of the horizontal protrusion of one side of longitudinal ones in the crawler circumferential direction (in the metal core width direction) may have a tapered horn portion. When the metal cores are embedded in the rubber crawler body, the ends of the horizontal protrusions overlap within the fixed length in the crawler width direction and in the crawler thickness direction in the state that one of them facing between the adjacent metal cores has the horn portion and the other has none.

Therefore, when the crawler is wound around the idler or the sprocket, the horizontal protrusions do not interfere with the metal cores, and therefore, the distance from the horn portion to the adjacent metal core is reduced so that the crawler track contacts on the ground (in horizontal state). Therefore, the distance by which the horizontal protrusions overlap between the adjacent metal cores is increased, and the overlapping state can be effectively maintained. Accordingly, crawler departure is effectively prevented.

Besides, when the distance "r" is within $\Delta r \leq r \leq 2\Delta r$, there is no space between the ends of the horizontal protrusions between the adjacent metal cores when the rubber crawler track is wound around the idler sprocket. The shearing force participated when the driving force is transmitted from the sprocket teeth to the metal core engaging portion does not concentrate on a metal core but disperses to the adjacent metal core through the horizontal protrusions. The shearing force is dispersed to the next metal core through the horizontal protrusions one after another. Therefore, the metal cores are prevented from separating from the rubber crawler track.

Furthermore, left and right guide protrusions in the crawler width (core metal longitudinal) direction of the metal core are shifted longitudinally in the crawler circumferential (core metal width) direction, and the highest position is shifted longitudinally from the center of the metal core. Therefore, when the metal cores are embedded in the rubber crawler track, the guide protrusions are arranged in zigzag. Accordingly, the parting plane of the mold is shifted laterally from the center of the metal core at the guide protrusion side.

Generally, producing the metal core with the complicated-shaped horizontal protrusions needs to form the parting plane of the mold so as to part laterally because a trimming taper needs to be formed to extract the metal core from the mold. On the contrary, producing the metal core disclosed in Japanese patent No. 2554552 and Japanese utility model publication No. 000226 of 1996 needs to form the parting plane so as to part vertically with relations between the shape of the guide protrusion top and the trimming taper of the parting plane. Accordingly, it is impossible to adopt the shape of the guide protrusion disclosed in Japanese patent No. 2554552 and Japanese utility model publication No. 000226 of 1996 to the metal core with horizontal protrusions because of restriction on producing. Therefore, the parting plane of the mold must be parted laterally for the metal core with the horizontal protrusions, and therefore, the guide protrusion top is the highest at the center of the metal core, and traveling vibration is increased.

The height of the guide protrusion top can be lowered on the center line of the crawler longitudinal direction of the metal core by shifting the left and right guide protrusions in the crawler width direction longitudinally in the crawler circumferential direction and laterally shifting the parting plane of the mold at the guide protrusion side. In this case, traveling vibration due to the shape of the rolling face disclosed in Japanese patent No. 2554552 and Japanese utility model publication No. 000226 of 1996 can be effectively prevented. Accordingly, even metal cores with the horizontal protrusions can prevent traveling vibration.

Besides, as to the shape of the horizontal protrusions, it is desirable that one of the horizontal protrusions of the adjacent metal cores in the crawler circumferential direction is L-shaped and the other is shaped as a converse L.

Therefore, the overlap portions of the horizontal protrusions facing the adjacent metal cores in the crawler circumferential direction are positioned near the steel cord layer of a bending center of the rubber crawler track. Accordingly, the crawler coming-off can be effectively prevented. Besides, when the idler and the sprocket wind and reversely bend, cracks occur on the rubber portion of the rubber crawler track because the horizontal protrusions mutually shift at the overlap portion. However, the rubber crawler track can be prevented from being damaged by spread of the cracks.

In addition, the section modulus can be enlarged more than usual due to the horizontal protrusion being L-shaped, thereby increasing the strength.

EXAMPLE 1

The present invention is explained in detail with reference to the figures as follows.

Figure 1:
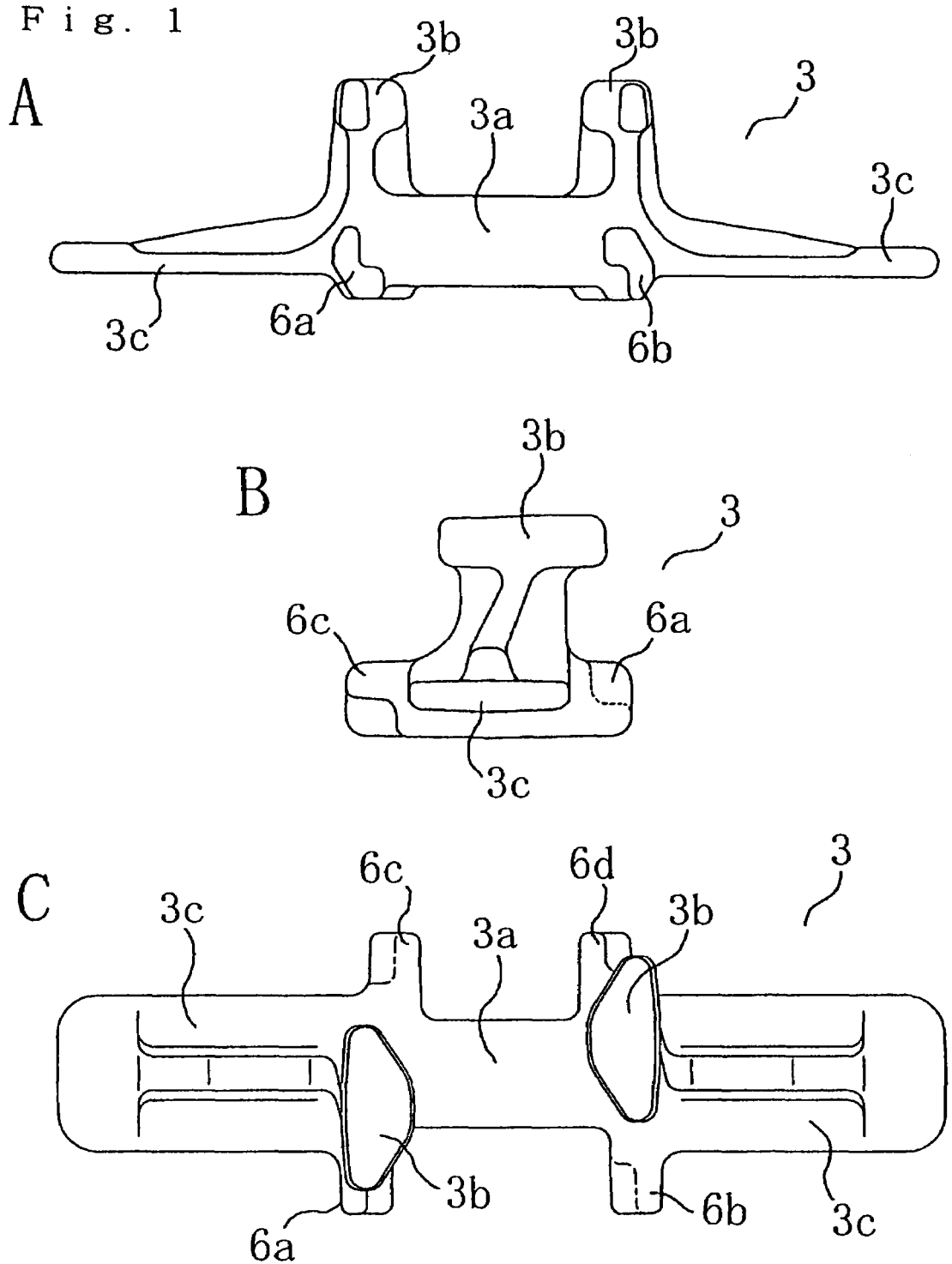
FIG. 1 shows a metal core to be embedded in a rubber crawler body
Figure 2:
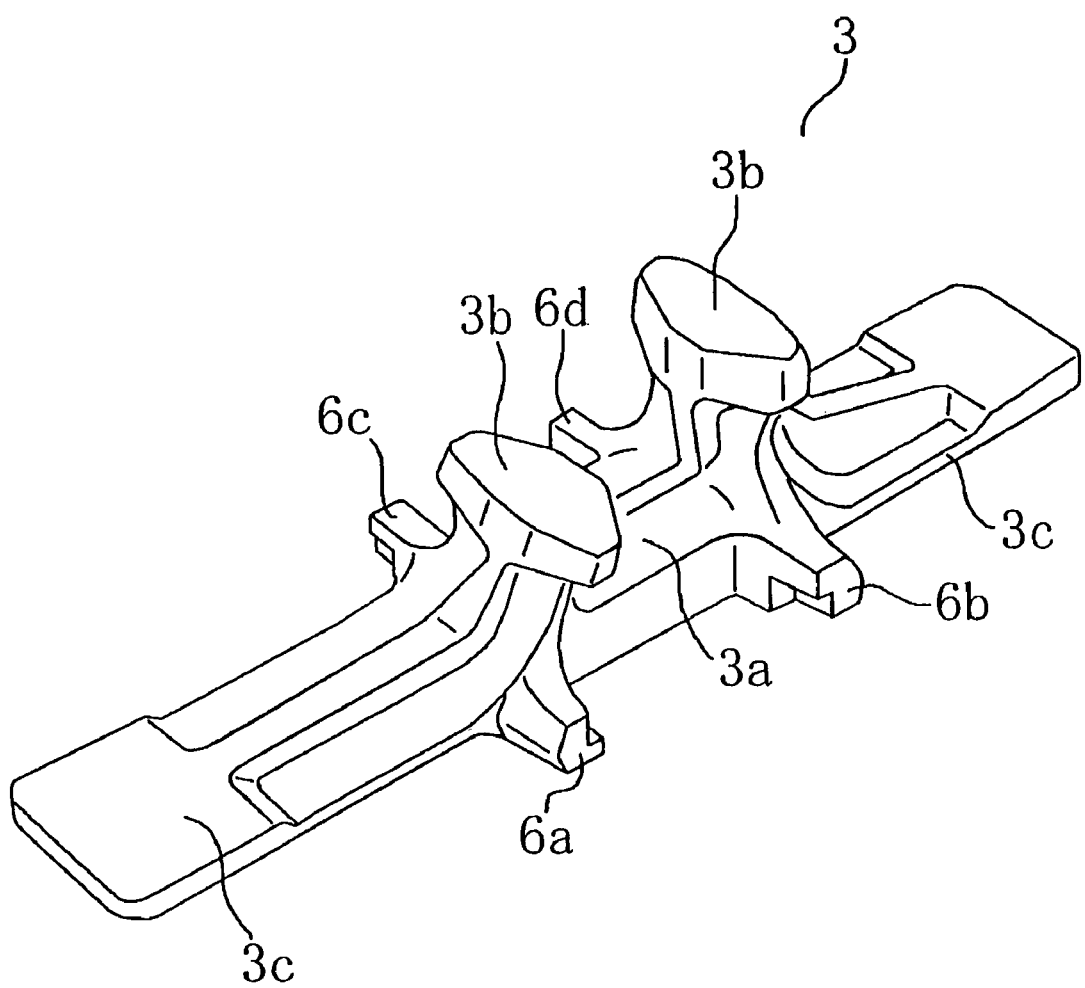
FIG. 2 is a perspective view of core to be embedded in the rubber crawler body. (The first embodiment)

FIG. 1 shows a metal core 3 to be embedded in a rubber crawler body 2 (FIG. 3B) of a rubber crawler track 1 (FIG. 3A) in the first embodiment. FIG. 1A is a front view; FIG. 1B is a side view; and FIG. 1C is a plan view of a side opposite the tread of the metal core 3 embedded in the rubber crawler track. FIG. 2 is a perspective view of the metal core 3. FIG. 3 shows the rubber crawler track 1 in the first embodiment. FIG. 3A is a plan view of a side opposite the tread; FIG. 3B is a sectional view taken along X-X of FIG. 3A; and FIG. 3C is a side view of FIG. 3A.

The rubber crawler track 1 comprises the rubber crawler body 2 of an endless belt body formed by a rubber elastic body, metal cores 3, lugs 4 and steel cord 5 rows. The metal cores 3 are embedded in the rubber crawler body 2 at a fixed interval in the crawler circumferential direction. The lugs 4 protrude from the tread side T of the rubber crawler track 1. The steel cord 5 rows are so formed that many steel cords 5 are divided to the left and right of metal core engaging portions 3a that engage a driving wheel of a travelling device and are embedded as a layer in the crawler circumferential direction on the outer periphery of the metal cores 3.

The metal core 3 comprises an engaging portion 3a, guide protrusions 3b for preventing wheel run-off, left and right wing portions 3c, and horizontal protrusions 6, which are more specifically designated 6a-6d. The engaging portion 3a is provided at the center of the length direction of the metal core. The guide protrusions 3b and the wing portions 3c are provided on both sides of the engaging portion 3a. The horizontal protrusions 6 are provided on sides of the metal core, in the width direction thereof, on at least one of the sides of the engaging portion 3a, extending from within the thickness of the wing portion in the vertical direction to below the thickness of the wing portion on the tread side of the metal core.

The horizontal protrusions 6 facing between the adjacent metal cores in the crawler circumferential direction of the first embodiment are overlapped within the fixed length in the crawler width direction and in the crawler thickness direction of the metal core 3. As for the shape of the horizontal protrusion 6, a horizontal protrusion 6a of one side (left side in FIG. 1A) in the metal core longitudinal direction is L-shaped, and a horizontal protrusion 6b in the other side (right side in FIG. 1A) is shaped as a converse L. In the metal core width direction, the distance between the left and right horizontal protrusions (the distance 6c-6d) in the metal core longitudinal direction of one side is fitted to the distance between the left and right horizontal protrusions (the distance 6a-6b) in the metal core longitudinal direction of the other side. In addition, as for the shape of the left and right metal cores in the metal core width direction, the horizontal protrusion 6a of the one side (downside of FIG. 1C) is L-shaped, and a horizontal protrusion 6c of the other side (upside of FIG. 1C) is shaped as a converse L.

Accordingly, the overlap of the horizontal protrusions facing between the adjacent metal cores in the crawler width direction is not varied much in winding or conversely bending the idler and the sprocket, thereby preventing side displacement suitably. In addition, the rubber portion at the horizontal protrusions is prevented from cracking. Therefore, the rubber crawler track is improved in durability.

In addition, the horizontal protrusions are so constructed that ones facing between the adjacent metal cores overlap in the crawler width direction and in the crawler thickness direction when they are embedded in the rubber crawler body. Accordingly, the crawler track can be prevented from twisting, as well as from side displacement and metal core separation due to external force. Besides, although the overlap against twisting of the horizontal protrusions facing at one place forms only one side (such as clockwise), the overlap due to the facing horizontal protrusion is on the opposite side (anti-clockwise). Accordingly, the crawler track can be prevented from twisting synthetically.

FIG. 4 is a view for explaining the horizontal protrusions between the adjacent metal cores 3 embedded in the rubber crawler body 2 in the first embodiment. FIG. 4A is an explanatory view of a side of the adjacent metal cores while the crawler track contacts the ground (in a horizontal state). FIG. 4B is an explanatory view of the side of the adjacent metal cores while the crawler track is wound around the idler and the sprocket of the traveling device.

A distance "r" in the first embodiment is 1.6 mm ($\Delta r$). The distance from the steel cord 5 layer embedded in the rubber crawler body to the horizontal protrusion is 6 mm; the number of teeth of the sprocket of the traveling device is 23; and $\Delta r = 2 \times 3.14 \times 6/23 = 1.64$ mm.

In this case, since the rubber crawler track is usually produced through a straight pressure-hot forming, rubber exists between the end of the horizontal protrusion and the adjacent metal core. Therefore, in consideration of compressive degree, it is preferable that the distance "r" is set from $\Delta r$ to $2\Delta r$ longer than $\Delta r$. Here, $\Delta r$ is the distance from the end of the horizontal protrusion to the adjacent metal core, $\Delta r$ being essentially 0 when the rubber crawler track is wound around the sprocket-winding portion. In the first embodiment, "r" is from 1.6 mm to 3.2 mm.

When setting a distance r1 from the end of the horizontal protrusion to the adjacent metal core between the metal cores at a side opposite the tread and a distance r2 on the tread side from $\Delta r$ to $2\Delta r$ as shown in FIG. 5, these distances become effectively-essentially 0 when the rubber crawler track is wound around the sprocket-winding portion.

The distance between the metal core and the end of the horizontal protrusion between the adjacent metal cores essentially ceases to exist when the rubber crawler track is wound around the sprocket-winding portion. According to this, the shearing force occurring when the driving force is transmitted from the sprocket teeth to the metal core engaging portion is dispersed to the adjacent metal core through the end of the horizontal protrusion. Therefore, the metal cores are prevented from separating from the rubber crawler body.

FIG. 6 is a graph showing a ratio of load for each tooth of the sprocket when traction capacity is transmitted from the sprocket to the rubber crawler track.

As shown in FIG. 6, a tractive force is not transmitted equally to the rubber crawler track from the teeth of the sprocket. The No. 10 tooth shows the maximum shearing ratio. Thus, the tractive force is concentratively transmitted to the rubber crawler from a part of the teeth.

Accordingly, the shearing force caused by the tractive force (the driving force), which is concentratively transmitted from a part of the sprocket teeth to the metal core engaging portion, is dispersed from the metal core receiving the tractive force to the adjacent metal core through the end of the horizontal protrusion by the distance from the end of the horizontal protrusion to the metal core essentially ceasing to exist when winding the rubber crawler track around the sprocket-winding portion. The shearing force is further dispersed to succeeding metal cores in order. Therefore, the metal cores can be prevented from separating from the rubber crawler body.

In addition, when the driving force is transmitted from the sprocket teeth to the metal core engaging portion, a separating force of the metal core in a crawler inner peripheral direction can be dispersed to the adjacent metal cores by the overlap in the crawler thickness direction of the horizontal protrusion at same time. Accordingly, the metal core can remarkably keep the durability of the adhesive surface, thereby reducing the shearing area between the metal core and the steel cords, and costs.

FIG. 7 is an explanatory view of a metal core showing a parting plane of a mold for producing the metal core of the first embodiment. FIG. 7A is a plan view of the side opposite the tread of the metal core embedded in the rubber crawler track; FIG. 7B is a side view; and FIG. 7C is a plan view of the tread side.

In the first embodiment, the left and right guide protrusions of the metal core are shifted in the circumferential direction so as to be arranged in a zigzag as shown in FIG. 1C and FIG. 3A. Therefore, as shown in FIG. 7, the parting plane of the mold is laterally shifted at the guide protrusions and with the guide protrusions.

According to this, the height of the guide protrusion top on the central line of the metal core in the crawler longitudinal direction can be lowered, and the shape of the rolling plane is formed by the left and right guide protrusions in the metal core longitudinal direction. Therefore, even a metal core with the horizontal protrusions can prevent travelling vibration.

FIG. 8 is a graph showing the rolling-wheel sinkage of the conventional metal core and the metal core of the present invention. The conventional metal core is produced by a conventional mold parting laterally, the guide protrusion top forming a trimming taper from the center. A mold used in the present invention is formed so as to shift the left and right guide protrusions longitudinally in the crawler circumferential direction and so as to shift the parting plane laterally at the guide protrusions and with the guide protrusions.

As shown in FIG. 8, the sinkage varies greatly in the metal core whose guide protrusion top forms the trimming taper because the rolling wheel sinks most near the center of the guide protrusion and does not sink much at the ends. On the other hand, in the metal core produced by the mold in the present invention, the sinkage is almost equal.

In this way, the invention of the first embodiment can prevent the traveling vibration suitably.

EXAMPLE 2

FIG. 9 shows a metal core 3' embedded in the rubber crawler body of the second embodiment. FIG. 9A is a plan view of the side opposite the tread, and FIG. 9B is a side view.

The metal core 3' has a tapered horn portion 7 on an end of the horizontal protrusion of one side in the crawler circumferential direction (metal core width direction). When the metal core 3' is embedded in the rubber crawler body, the ends of the horizontal protrusions 6' between adjacent metal cores in the crawler circumferential direction overlap within a fixed length in the crawler width direction and in the crawler thickness directions. In this case, only one of the horizontal protrusions has the horn portion 7.

The metal core 3' in FIG. 9 will be explained. The horn portion 7 is provided on the horizontal protrusion 6a', not on the horizontal protrusion 6c' on the opposite side in the metal core width direction as shown in FIG. 9A. And, it is not provided on the horizontal protrusion 6b' opposite to the horizontal protrusion 6a' in the metal core 3' longitudinal direction, but is provided on the horizontal protrusion 6d' having point symmetry.

FIG. 10 is a view for explaining the horizontal protrusions between the adjacent metal cores 3' of the second embodiment. FIG. 10A is an explanatory view of the side showing the relation of the adjacent metal cores while the crawler track contacts the ground (in a horizontal state). FIG. 10B is an explanatory view of the side showing the relation of the adjacent metal cores while the crawler track is wound around the idler and the sprocket of the traveling device.

As shown in FIG. 10B, the horn portions do not interfere with the metal cores adjacent to the horizontal protrusions when the crawler track is wound around the idler and the sprocket. Accordingly, as shown in FIG. 10A, it is possible to shorten the distance between the horn portion 7 and the adjacent metal core when the crawler track contacts the ground. As a result, the overlap length of the horizontal protrusions between the adjacent metal cores is increased to maintain the overlap of the horizontal protrusions. Therefore, the crawler track is prevented from coming off.

The invention claimed is:

1. A rubber crawler track to be driven by a driving device, the rubber crawler track comprising:
   a rubber crawler body shaped as an endless belt made of a rubber elastic body;
   a layer comprising a plurality of steel cords embedded in said rubber crawler body; and
   metal cores embedded in said rubber crawler body at a fixed interval in a crawler circumferential direction, each of said metal cores comprising
   an engaging portion formed at the center in a metal core length direction;
   guide protrusions for preventing wheel run-off;
   wing portions, said guide protrusions and said wing portions each being formed at opposite sides of the engaging portion; and
   horizontal protrusions formed on sides of the metal core in a width direction of the metal core at opposite sides of said engaging portion, said horizontal protrusions facing adjacent metal cores in the crawler circumferential direction and overlapping the horizontal protrusions of adjacent metal cores,
wherein a distance "r" in the crawler circumferential direction between the ends of the horizontal protrusions and adjacent metal cores is expressed as $\Delta r \leq r \leq 2\Delta r$ when the rubber crawler track is horizontal, wherein $\Delta r = 2\pi h/n$, wherein "h" is the distance from the layer of steel cords to portions of the horizontal protrusions that contact one another when the crawler track is wound around a sprocket, and "n" is the number of teeth of the sprocket for engaging the rubber crawler track.

2. A rubber crawler track according to claim 1, wherein the horizontal protrusions have ends, and a tapered horn portion is provided on an end of one of the horizontal protrusions on one side of each metal core.

* * * * *